United States Patent
Higashi et al.

(10) Patent No.: US 10,308,844 B2
(45) Date of Patent: Jun. 4, 2019

(54) PRESSURE-SENSITIVE ADHESIVE, PRESSURE-SENSITIVE ADHESIVE LAYER, AND PRESSURE-SENSITIVE ADHESIVE SHEET

(75) Inventors: Masatsugu Higashi, Osaka (JP); Akiko Tanaka, Osaka (JP); Aimi Matsuura, Osaka (JP); Kiyoe Shigetomi, Osaka (JP); Tetsuo Inoue, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/115,228

(22) PCT Filed: Apr. 23, 2012

(86) PCT No.: PCT/JP2012/060864
§ 371 (c)(1),
(2), (4) Date: Nov. 1, 2013

(87) PCT Pub. No.: WO2012/150682
PCT Pub. Date: Nov. 8, 2012

(65) Prior Publication Data
US 2014/0065417 A1  Mar. 6, 2014

(30) Foreign Application Priority Data
May 2, 2011 (JP) .................. 2011-102968
Apr. 18, 2012 (JP) .................. 2012-094877

(51) Int. Cl.
*C09J 135/02* (2006.01)
*C09J 133/08* (2006.01)
(Continued)

(52) U.S. Cl.
CPC .............. *C09J 135/02* (2013.01); *C09J 4/06* (2013.01); *C09J 7/22* (2018.01); *C09J 7/385* (2018.01);
(Continued)

(58) Field of Classification Search
None
See application file for complete search history.

(56) References Cited

U.S. PATENT DOCUMENTS

| 4,077,926 A | 3/1978 | Sanderson et al. |
| 4,360,638 A | 11/1982 | Bartman |

(Continued)

FOREIGN PATENT DOCUMENTS

| CN | 101781529 A | 7/2010 |
| CN | 101805573 A | 8/2010 |

(Continued)

OTHER PUBLICATIONS

Aldrich Data Sheet (2015).*
(Continued)

*Primary Examiner* — Frank D Ducheneaux
(74) *Attorney, Agent, or Firm* — Sughrue Mion, PLLC

(57) ABSTRACT

A pressure-sensitive adhesive of the invention include a (meth)acryl-based polymer obtained by polymerization of a monomer component including 19 to 99.5% by weight of an alkyl (meth)acrylate having a branched alkyl group of 10 to 24 carbon atoms at an ester end. The pressure-sensitive adhesive has a satisfactory level of adhesive performance and can form a pressure-sensitive adhesive layer with a lower dielectric constant.

12 Claims, 1 Drawing Sheet

(51) Int. Cl.
*C09J 133/10* (2006.01)
*C09J 7/38* (2018.01)
*C09J 7/22* (2018.01)
*G02B 5/30* (2006.01)
*C08K 5/103* (2006.01)
*C08F 220/18* (2006.01)
*C08F 220/26* (2006.01)
*C09J 133/06* (2006.01)
*C09J 4/06* (2006.01)
*C08K 5/00* (2006.01)

(52) U.S. Cl.
CPC ......... *C09J 133/066* (2013.01); *C09J 133/08* (2013.01); *C09J 133/10* (2013.01); *C08F 220/26* (2013.01); *C08F 2220/1891* (2013.01); *C08K 5/0025* (2013.01); *C08K 5/103* (2013.01); *C09J 2201/606* (2013.01); *C09J 2201/622* (2013.01); *C09J 2203/318* (2013.01); *C09J 2205/10* (2013.01); *C09J 2400/00* (2013.01); *C09J 2433/00* (2013.01); *G02B 5/30* (2013.01); *Y10T 428/2891* (2015.01)

(56) References Cited

U.S. PATENT DOCUMENTS

| | | | |
|---|---|---|---|
| 4,423,182 A | 12/1983 | Bartman | |
| 5,602,221 A | 2/1997 | Bennett et al. | |
| 5,616,670 A | 4/1997 | Bennett et al. | |
| 5,620,795 A | 4/1997 | Haak et al. | |
| 5,654,387 A | 8/1997 | Bennett et al. | |
| 5,683,798 A | 11/1997 | Bennett et al. | |
| 5,708,109 A | 1/1998 | Bennett et al. | |
| 5,708,110 A | 1/1998 | Bennett et al. | |
| 5,756,584 A | 5/1998 | Bennett et al. | |
| 5,883,149 A | 3/1999 | Bennett et al. | |
| 6,126,865 A | 10/2000 | Haak et al. | |
| 7,070,051 B2* | 7/2006 | Kanner et al. | 206/382 |
| 2001/0019766 A1 | 9/2001 | Masuda et al. | 428/345 |
| 2003/0232192 A1 | 12/2003 | Kishioka et al. | |
| 2004/0191509 A1 | 9/2004 | Kishioka et al. | |
| 2005/0202238 A1 | 9/2005 | Kishioka et al. | |
| 2005/0261433 A1* | 11/2005 | Takeko et al. | 525/222 |
| 2007/0218276 A1* | 9/2007 | Hiramatsu et al. | 428/354 |
| 2008/0213583 A1* | 9/2008 | Noguchi | B32B 27/00 428/355 AC |
| 2009/0017298 A1 | 1/2009 | Okada et al. | |
| 2009/0258224 A1* | 10/2009 | Kawabe | C09J 7/0246 428/339 |
| 2010/0183872 A1 | 7/2010 | Nonaka et al. | |
| 2010/0209649 A1 | 8/2010 | Kuwahara et al. | |
| 2010/0209703 A1* | 8/2010 | Takarada et al. | 428/355 AC |
| 2010/0215955 A1* | 8/2010 | Kishioka | B32B 7/12 428/355 AC |
| 2010/0271328 A1 | 10/2010 | Sekiguchi et al. | |
| 2011/0033720 A1 | 2/2011 | Fujita et al. | |
| 2011/0076492 A1* | 3/2011 | Fujita | C08J 3/245 428/355 AC |
| 2011/0111220 A1* | 5/2011 | Takarada et al. | 428/345 |
| 2011/0118372 A1* | 5/2011 | Lester et al. | 521/149 |
| 2011/0217542 A1 | 9/2011 | Moroishi et al. | |
| 2012/0094037 A1* | 4/2012 | Banba et al. | 428/1.5 |
| 2012/0183769 A1 | 7/2012 | Nasu et al. | |
| 2012/0244348 A1 | 9/2012 | Park et al. | |
| 2013/0211028 A1* | 8/2013 | Shinike | G06F 3/044 526/307.5 |

FOREIGN PATENT DOCUMENTS

| | | | |
|---|---|---|---|
| JP | 58-125774 A | 7/1983 | |
| JP | 58-198349 A | 11/1983 | |
| JP | 63-118386 A | 5/1988 | |
| JP | 4-345679 A | 12/1992 | |
| JP | 5-140510 A | 6/1993 | |
| JP | 6-122859 A | 5/1994 | |
| JP | 8-325544 A | 12/1996 | |
| JP | 9-505103 A | 5/1997 | |
| JP | 9-324164 A | 12/1997 | |
| JP | 11-140406 A | 5/1999 | |
| JP | 2000-313864 A | 11/2000 | |
| JP | 2001-288438 A | 10/2001 | |
| JP | 2002-363530 A | 12/2002 | |
| JP | 2003-238915 A | 8/2003 | |
| JP | 2003-342542 A | 12/2003 | |
| JP | 2004-231723 A | 8/2004 | |
| JP | 2006-45474 A | 2/2006 | |
| JP | 2008-195753 A | 8/2008 | |
| JP | 2008-195880 A | 8/2008 | |
| JP | 2008-308633 A | 12/2008 | |
| JP | 2008308633 A * | 12/2008 | ............ C09J 133/06 |
| JP | 2009-35722 A | 2/2009 | |
| JP | 2009-173772 A | 8/2009 | |
| JP | 2010-272105 A | 12/2010 | |
| JP | 2011-16908 A | 1/2011 | |
| JP | 2011-32418 A | 2/2011 | |
| JP | 2011-53544 A | 3/2011 | |
| JP | 2013-506186 A | 2/2013 | |
| JP | 5469194 B2 | 4/2014 | |
| JP | 5932857 B2 | 6/2016 | |
| KR | 10-2006-0043847 A | 5/2006 | |
| KR | 10-2010-0009544 A | 1/2010 | |
| KR | 10-2011-0002857 A | 1/2011 | |
| KR | 10-2011-0039413 A | 4/2011 | |
| WO | 2009/126532 A2 | 10/2009 | |
| WO | WO 2010147047 A1 * | 12/2010 | |
| WO | 2011/040422 A1 | 4/2011 | |
| WO | WO 2012023567 A1 * | 2/2012 | ............ C09J 133/14 |

OTHER PUBLICATIONS

Human translation of JP 2005307082_A (2005).*
International Search Report of PCT/JP2012/060864, dated Jul. 17, 2012.
Office Action in corresponding JP 2012-094877, dated Sep. 24, 2013.
PCT/IB/338, with Attached International Preliminary Report on Patentability and Written Opinion, received in counterpart PCT/JP2012/060864.
XP-002728658, Thomson Scientific, London, GB; AN 2002-117645.
Extended European Search Report issued in corresponding foreign Patent Application No. 12779805.6, dated Aug. 27, 2014.
Chinese Office Action issued in corresponding Patent Application No. 201280019974.3 dated Jan. 19, 2015.
Offer of Information issued in corresponding Japanese Patent Application No. 2014-015146, dated May 25, 2015.
Taiwanese Office Action issued in corresponding Patent Application No. 101115569, dated May 25, 2015.
Chinese Office Action issued in corresponding foreign Patent Application No. 201280019974.3 dated Sep. 30, 2015.
Japanese Office Action issued in corresponding foreign Patent Application No. 2014-015146 dated Nov. 6, 2015.
Chinese Office Action issued in corresponding Chinese Application No. 201280019974.3 dated Apr. 12, 2016.
Decision of Rejection dated Oct. 10, 2016 issued from the State Intellectual Property Office of P. R. China in Chinese Application No. 201280019974.3
Communication dated May 18, 2017 from the State Intellectual Property Office of the P.R.C. in corresponding Chinese Application No. 201280019974.3.
Decision to Grant Patent dated Jul. 4, 2017 from the Japanese Patent Office in corresponding Japanese Application No. 2016-090998.
Office Action dated Jul. 4, 2017 from the Japanese Patent Office in corresponding Japanese Application No. 2016-090999.
Office Action dated Sep. 25, 2017 issued from the State Intellectual Property Office of P. R. China in Chinese Application No. 201280019974.3.

(56) References Cited

OTHER PUBLICATIONS

Office Action dated Nov. 27, 2017 from the Korean Patent Office in Korean Application No. 10-2013-7031781.
Notice of Allowance dated May 14, 2018 from the Korean Patent Office in Korean Application No. 10-2013-7031781.

* cited by examiner

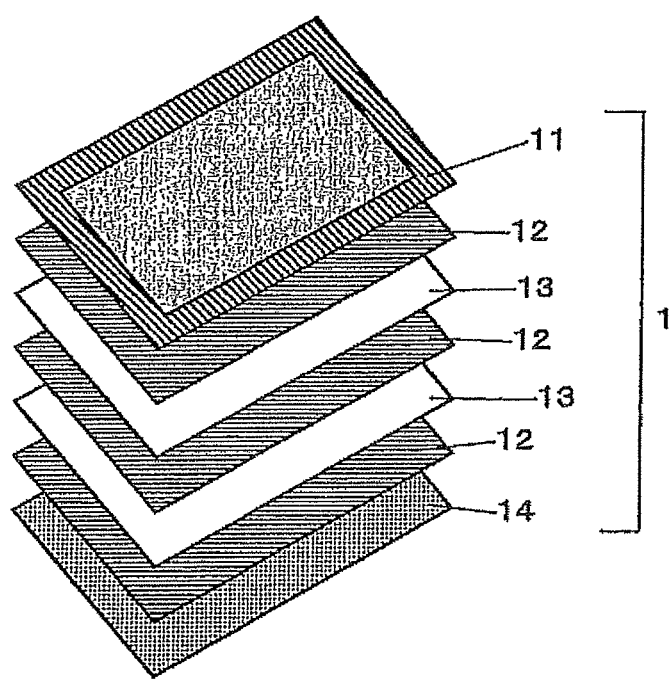

PRESSURE-SENSITIVE ADHESIVE, PRESSURE-SENSITIVE ADHESIVE LAYER, AND PRESSURE-SENSITIVE ADHESIVE SHEET

CROSS REFERENCE TO RELATED APPLICATIONS

This application is a National Stage of International Application No. PCT/JP2012/060864 filed Apr. 23, 2012, claiming priority based on Japanese Patent Application Nos. 2011-102968, filed May 2, 2011 and 2012-094877, filed Apr. 18, 2012, the contents of all of which are incorporated herein by reference in their entirety.

TECHNICAL FIELD

The invention relates to a pressure-sensitive adhesive capable have a lower dielectric constant. The invention also relates to a pressure-sensitive adhesive layer obtained from such a pressure-sensitive adhesive and to a pressure-sensitive adhesive sheet including a support and such a pressure-sensitive adhesive layer provided on at least one side of the support.

The pressure-sensitive adhesive layer or the pressure-sensitive adhesive sheet of the invention is suitable for use in optical applications. For example, the pressure-sensitive adhesive layer or the pressure-sensitive adhesive sheet of the invention is suitable for use in the manufacture of image display devices such as liquid crystal display devices, organic electro-luminescent (EL) display devices, plasma display panels (PDPs), and electronic paper, and is also suitable for use in the manufacture of input devices such as touch panels including optical, ultrasonic, capacitance, and resistive types. In particular, the pressure-sensitive adhesive layer or the pressure-sensitive adhesive sheet of the invention is advantageously used in capacitance touch panels.

The pressure-sensitive adhesive sheet of the invention is also useful as a pressure-sensitive adhesive optical member, in which an optical member is used as the support. For example, when a transparent conductive film is used as the optical member, the pressure-sensitive adhesive optical member can be used as a pressure-sensitive adhesive layer-carrying transparent conductive film. Such a pressure-sensitive adhesive layer-carrying transparent conductive film may be used as a transparent electrode in the image display device or the touch panel mentioned above after it is processed appropriately. In particular, the pressure-sensitive adhesive layer-carrying transparent conductive film with a patterned transparent conductive thin layer is advantageously used as an electrode substrate for an input device of a capacitance touch panel. Additionally, the pressure-sensitive adhesive layer-carrying transparent conductive film can be used for electromagnetic wave shielding or prevention of static buildup on transparent products and to form liquid crystal dimming glass products and transparent heaters.

When an optical film is used as the optical member, the pressure-sensitive adhesive optical member can be used as a pressure-sensitive adhesive layer-carrying optical film. The pressure-sensitive adhesive layer-carrying optical film is used for an image display device such as a liquid crystal display device and an organic electroluminescence (EL) display device. The optical film may be a polarizing plate, a retardation plate, an optical compensation film, a brightness enhancement film, a laminate thereof, or the like.

BACKGROUND ART

In recent years, input devices having a combination of a touch panel and an image display device, such as cellular phones and portable music players, have become popular. In particular, capacitance touch panels have rapidly become popular because of their functionality.

There are now many known transparent conductive films for use in touch panels, which include a laminate of a transparent plastic film substrate or a glass sheet and a transparent conductive thin layer (ITO layer). A transparent conductive film can be laminated on any other member with a pressure-sensitive adhesive layer interposed therebetween. Various types of pressure-sensitive adhesive layers are proposed (Patent Document 1 to 4).

When the transparent conductive film is used as an electrode substrate for a capacitance touch panel, the transparent conductive thin layer used is patterned. The transparent conductive film with the patterned transparent conductive thin layer is laminated on another transparent conductive film or any other component with a pressure-sensitive adhesive layer interposed therebetween to form a laminate to be used. These transparent conductive films are advantageously used for a multi-touch input device, which can be operated by touching it with two or more fingers at the same time. Specifically, a capacitance touch panel is designed to achieve sensing when the amount of change in output signal, which is generated at a position where the touch panel is touched with a finger or the like, exceeds a certain threshold value.

PRIOR ART DOCUMENTS

Patent Documents

Patent Document 1: JP-A-2003-238915
Patent Document 2: JP-A-2003-342542
Patent Document 3: JP-A-2004-231723
Patent Document 4: JP-A-2002-363530

SUMMARY OF THE INVENTION

Problems to be Solved by the Invention

As mentioned above, the dielectric constant of a component or film used to form a touch panel is an important value related to the response of the touch panel. On the other hand, now, as touch panels have become popular, they have been required to have higher performance, and transparent conductive films or pressure-sensitive adhesive layers to be used as components thereof also have been required to have higher performance, in which a reduction in thickness is one of the requirements. However, there is a problem in that simply reducing the thickness of a pressure-sensitive adhesive layer can change the designed capacitance. Thus, there is a need to reduce the dielectric constant of a pressure-sensitive adhesive layer without changing the capacitance value when the pressure-sensitive adhesive layer is reduced in thickness. In some cases, an air layer between a printed glass or film and an optical film or an air layer above an LCD is filled with a pressure-sensitive adhesive layer so that visibility can be improved. On the other hand, however, such a pressure-sensitive adhesive may cause a malfunction if having high dielectric constant. To prevent such a malfunction, adhesive layers are required to have lower dielectric constant. In addition, the reduction in the dielectric constant of a pressure-sensitive adhesive layer is also expected to improve the response speed or sensitivity of a touch panel.

It is therefore an object of the invention to provide a pressure-sensitive adhesive that has a satisfactory level of adhesive performance and can form a pressure-sensitive adhesive layer with a lower dielectric constant.

It is another object of the invention to provide a pressure-sensitive adhesive layer made from such a pressure-sensitive adhesive and to provide a pressure-sensitive adhesive sheet having such a pressure-sensitive adhesive layer.

Means for Solving the Problems

As a result of intense investigations to solve the problems, the inventors have made the invention, based on the finding that the objects are achieved with a pressure-sensitive adhesive described below.

The invention relates to a pressure-sensitive adhesive, including a (meth)acryl-based polymer obtained by polymerization of a monomer component including 19 to 99.5% by weight of an alkyl (meth)acrylate having a branched alkyl group of 10 to 24 carbon atoms at an ester end.

In the pressure-sensitive adhesive, the monomer component may further include 0.1 to 30% by weight of at least one functional group-containing monomer selected from a carboxyl group-containing monomer, a hydroxyl group-containing monomer, and a cyclic ether group-containing monomer.

In the pressure-sensitive adhesive, the monomer component may further include 0.5% or more by weight of at least one selected from an alkyl (meth)acrylate having a branched alkyl group of 3 to 9 carbon atoms at an ester end, an alkyl (meth)acrylate having a linear alkyl group of 1 to 24 carbon atoms at an ester end and an alkyl (meth)acrylate having a cyclic alkyl group at an ester end.

In the pressure-sensitive adhesive, the monomer component may further contain 3% or less by weight or less of a polyfunctional monomer.

In the pressure-sensitive adhesive, the pressure-sensitive adhesive preferably further include 0.01 to 5 parts by weight of a crosslinking agent based on 100 parts by weight of the (meth)acryl-based polymer.

The pressure-sensitive adhesive is preferably for use on an optical member.

The invention also relates to a pressure-sensitive adhesive layer obtained from the above pressure-sensitive adhesive.

The pressure-sensitive adhesive layer preferably has a relative dielectric constant of 3.5 or less at a frequency of 100 kHz.

The pressure-sensitive adhesive layer preferably has a gel fraction of 20 to 98% by weight.

The pressure-sensitive adhesive layer preferably has a haze of 2% or less when having a thickness of 25 μm.

The pressure-sensitive adhesive layer is preferably for use on an optical member.

The invention also relates to a pressure-sensitive adhesive sheet including: a support; and the above pressure-sensitive adhesive layer formed on at least one side of the support.

The pressure-sensitive adhesive sheet preferably has an adhesive strength of 0.5 N/20 mm or more to alkali glass at a peel angle of 90° and a peel rate of 300 mm/minute.

The pressure-sensitive adhesive sheet is preferably for use on an optical member. The pressure-sensitive adhesive sheet is preferably a pressure-sensitive adhesive optical member including an optical member as the support and the pressure-sensitive adhesive layer provided on at least one side of the optical member.

Effect of the Invention

The (meth)acryl-based polymer as a main component of the pressure-sensitive adhesive of the invention is obtained by polymerization of a monomer component including a predetermined amount of an alkyl (meth)acrylate having a relatively long branched chain alkyl group. The relatively long branched chain alkyl group in the pressure-sensitive adhesive of the invention is effective in forming a pressure-sensitive adhesive layer with a lower dielectric constant and in providing a satisfactory level of adhesive performance. Also when an air layer is filled with a pressure-sensitive adhesive layer, malfunctions can be prevented because of the low dielectric constant of the adhesive layer.

To lower the dielectric constant, it is said that the dipole moment of the molecule may be reduced, and the molar volume of the molecule may be increased, according to the Clausius-Mossotti equation. The alkyl (meth)acrylate as a principal monomer unit of the (meth)acryl-based polymer, a main component of the pressure-sensitive adhesive of the invention, has a relatively long branched chain alkyl group. Thus, the pressure-sensitive adhesive layer obtained from the pressure-sensitive adhesive of the invention is considered to have an increased molar volume and a lowered dipole moment because of its branched alkyl group. Such a pressure-sensitive adhesive layer with a higher molar volume and a lower dipole moment balanced with each other is considered to be achieved when an alkyl (meth)acrylate having a branched alkyl group of 10 to 24 carbon atoms at the ester end is used.

For example, the pressure-sensitive adhesive layer of the invention can have a relative dielectric constant as low as 3.5 or less at a frequency of 100 kHz. This feature makes it possible to design capacitance touch panels with no change in capacitance value even when the pressure-sensitive adhesive layer of the invention is reduced in thickness to form a transparent conductive film for use in capacitance touch panels.

BRIEF DESCRIPTION OF THE DRAWINGS

FIG. 1 is a view showing an example of a capacitance touch panel produced using the pressure-sensitive adhesive layer or the pressure-sensitive adhesive sheet of the invention.

MODE FOR CARRYING OUT THE INVENTION

The pressure-sensitive adhesive of the invention contains a (meth)acryl-based polymer obtained by polymerization of a monomer component including 19 to 99.5% by weight of an alkyl (meth)acrylate having a branched alkyl group of 10 to 24 carbon atoms at the ester end. As used herein, the term "alkyl (meth)acrylate" refers to alkyl acrylate and/or alkyl methacrylate, and "(meth)" is used in the same meaning in the description.

The alkyl (meth)acrylate having a branched alkyl group of 10 to 24 carbon atoms at the ester end is preferably capable of forming a homopolymer having a glass transition temperature (Tg) of −80 to 0° C., more preferably −70 to −10° C. If the Tg of the homopolymer is −80° C. or lower, the pressure-sensitive adhesive may have too low an elastic modulus at normal temperature, which is not preferred. If the Tg of the homopolymer is higher than 0° C., the adhesive strength may be undesirably reduced. The Tg of the homopolymer is the value measured using a differential scanning calorimetry (DSC) system. To achieve low dielectric constant and moderate elastic modulus, the branched alkyl group has 10 to 24 carbon atoms. Based on this, an alkyl (meth)acrylate having a suitable alkyl group can be selected as needed depending on the method of producing the (meth)acryl-based polymer. For example, when the (meth)acryl-based polymer is produced by solution polymerization or the like, the alkyl group preferably has 10 to 18 carbon atoms, more preferably 10 to 16 carbon atoms, even more preferably 10 to 14 carbon atoms. When the (meth) acryl-based polymer is produced by radiation polymerization or the like, the alkyl group preferably has 12 to 18 carbon atoms, more preferably 14 to 18 carbon atoms. It should be noted that a straight-chain alkyl group or an alkyl group of 9 or less carbon atoms is less effective in lowering the dielectric constant of the pressure-sensitive adhesive layer even though the homopolymer of the corresponding alkyl (meth)acrylate has a Tg of −80 to 0° C.

Examples of the alkyl (meth)acrylate having a branched alkyl group of 10 to 24 carbon atoms at the ester end include isodecyl acrylate (10 carbons, homopolymer Tg=−60° C., hereinafter, simply abbreviated as Tg), isodecyl methacrylate (10 carbons, homopolymer Tg=−41° C.), isomyristyl acrylate (14 carbons, homopolymer Tg=−56° C.), isostearyl acrylate (18 carbons, homopolymer Tg=−18° C.), 2-propylheptyl acrylate, isoundecyl acrylate, isododecyl acrylate, isotridecyl acrylate, isopentadecyl acrylate, isohexadecyl acrylate, isoheptadecyl acrylate, and methacrylate monomers corresponding to the above acrylates. These monomers may be used alone or in combination of two or more.

Of the branched alkyl group of 10 to 24 carbon atoms, those having a t-butyl group are preferable in consideration of particularly obtaining a pressure-sensitive adhesive with an increased molar volume, a lowered dipole moment, and a balance of both. An Example of the alkyl (meth)acrylate having a branched alkyl group of 10 to 24 carbon atoms, the alkyl group having t-butyl group, includes isostearyl acrylate represented by the following formula:

[Formula 1]

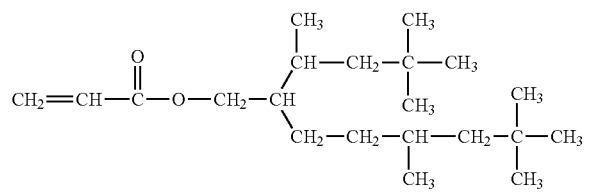

Also, as the alkyl (meth)acrylate having a branched alkyl group of 10 to 24 carbon atoms at the ester end, alkyl methacrylate is more preferable than alkyl acrylates in view of the effects of the pressure-sensitive adhesive layer lowering of dielectric constant due to an increase in molar volume and a reduction in dipole moment. On the other hand, the alkyl acrylate is more preferable than the alkyl methacrylate because when the alkyl acrylate is used, the (meth)acryl-based polymer can be produced with a shorter polymerization time and higher productivity. Particularly when the (meth)acryl-based polymer is produced by radiation polymerization, the alkyl acrylate is preferred.

The content of the alkyl (meth)acrylate having a branched alkyl group of 10 to 24 carbon atoms at the ester end is 19 to 99.5% by weight, preferably 25 to 99.5% by weight, more preferably 35 to 99.5% by weight, furthermore preferably 40 to 99.5% by weight, furthermore preferably 45 to 99.5% by weight, and furthermore preferably 45 to 96% by weight, based on the total weight of the monomer component used to form the (meth)acryl-based polymer. Use of 19% by weight or more of the alkyl (meth)acrylate is preferable in view of lowering of dielectric constant, and use of 99.5% by weight or less thereof is preferable in view of maintaining adhesive strength.

The monomer component used to form the (meth)acryl-based polymer according to the invention may further include at least one functional group-containing monomer selected from a carboxyl group-containing monomer, a hydroxyl group-containing monomer, and a cyclic ether group-containing monomer.

Any monomer having a carboxyl group and an unsaturated double bond-containing polymerizable functional group such as a (meth)acryloyl group or a vinyl group may be used without restriction as the carboxyl group-containing monomer. Examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid. These may be used alone or in any combination. Itaconic acid or maleic acid can be used in the form of an anhydride. Among these, acrylic acid and methacrylic acid are preferred, and acrylic acid is particularly preferred. In the invention, a carboxyl group-containing monomer may be or may not be used as an optional monomer to produce the (meth)acryl-based polymer. An adhesive containing a (meth)acryl-based polymer obtained from a monomer composition free of any carboxyl group-containing monomer can form a pressure-sensitive adhesive layer with reduced ability to corrode metals, because the ability to corrode metals would be due to any carboxyl group.

Any monomer having a hydroxyl group and an unsaturated double bond-containing polymerizable functional group such as a (meth)acryloyl group or a vinyl group may be used without restriction as the hydroxyl group-containing monomer. Examples of the hydroxyl group-containing monomer include hydroxyalkyl (meth)acrylate such as 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, or 12-hydroxylauryl (meth)acrylate; and hydroxyalkylcycloalkane (meth)acrylate such as (4-hydroxymethylcyclohexyl)methyl (meth)acrylate. Other examples include hydroxyethyl(meth)acrylamide, allyl alcohol, 2-hydroxyethyl vinyl ether, 4-hydroxybutyl vinyl ether, and diethylene glycol monovinyl ether. These may be used alone or in any combination. Among them, hydroxyalkyl (meth)acrylate is preferred.

Any monomer having a cyclic ether group such as an epoxy group or an oxetane group and an unsaturated double bond-containing polymerizable functional group such as a (meth)acryloyl group or a vinyl group may be used without restriction as the cyclic ether group-containing monomer. Examples of the epoxy group-containing monomer include glycidyl (meth)acrylate, 3,4-epoxycyclohexylmethyl (meth)acrylate, and 4-hydroxybutyl(meth)acrylate glycidyl ether. Examples of the oxetane group-containing monomer include 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate. These monomers may be used alone or in any combination.

In the invention, the content of the functional group-containing monomer is preferably from 0.1 to 30% by weight based on the total weight of the monomer component. The content of the functional group-containing monomer is preferably from 0.1% by weight or more, more preferably 0.5% or more, further preferably 0.8% or more used to form the (meth)acryl-based polymer so that adhesive strength and cohesive strength can be increased. If the content of the functional group-containing monomer is too high, a hard pressure-sensitive adhesive layer with a lower adhesive strength may be formed, and the pressure-sensitive adhesive may have too high a viscosity or may form a gel. Thus, the content of the functional group-containing monomer is preferably 30% by weight or less, more preferably 27% by weight or less, even more preferably 25% by weight or less based on the total weight of the monomer component used to form the (meth)acryl-based polymer.

The monomer component used to form the (meth)acryl-based polymer according to the invention may further include a copolymerizable monomer other than the functional group-containing monomer. For example, a copolymerizable monomer other than those described above may be an alkyl (meth)acrylate represented by the formula $CH_2=C(R^1)COOR^2$, wherein $R^1$ represents hydrogen or a methyl group, and $R^2$ represents a substituted or unsubstituted alkyl group of 1 to 24 carbon atoms, however, except a branched alkyl group of 10 to 24 carbon atoms.

The substituted or unsubstituted alkyl group of 1 to 24 carbon atoms (preferably 1 to 18 carbon atoms) represented by $R^2$ may be a linear, or branched alkyl group or cyclic alkyl group, and except a branched alkyl group of 10 to 24 carbon atoms. Specifically, $R^2$ represents a branched alkyl group of 3 to 9 carbon atoms. The substituted alkyl group preferably has an aryl group of 3 to 8 carbon atoms or an aryloxy group of 3 to 8 carbon atoms as a substituent. The aryl group is preferably, but not limited to, a phenyl group. Concerning this alkyl (meth)acrylate, the alkyl methacrylate is more preferred than the alkyl acrylate in order to lower dielectric constant by increasing molar volume and reducing dipole moment.

Examples of the monomer represented by $CH_2=C(R^1)COOR^2$ include methyl (meth)acrylate, ethyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, phenoxyethyl (meth)acrylate, benzyl (meth)acrylate, cyclohexyl (meth)acrylate, 3,3,5-trimethylcyclohexyl (meth)acrylate, isobornyl (meth)acrylate, terpene (meth)acrylate, and dicyclopentanyl (meth)acrylate. These monomers may be used alone or in any combination.

In the invention, the content of the (meth)acrylate represented by $CH_2=C(R^1)COOR^2$ may be 81% by weight or less, preferably 76% by weight or less, more preferably 60% by weight or less, even more preferably 55% by weight or less, based on the total weight of the monomer component used to form the (meth)acryl-based polymer. To maintain the level of adhesive strength, the (meth)acrylate represented by $CH_2=C(R^1)COOR^2$ is preferably used in an amount of 5% by weight or more, more preferably 10% by weight or more.

The preferred content of the (meth)acrylate represented by $CH_2=C(R^1)COOR^2$, which can be used in the amount mentioned above, may be selected as needed depending on the method of producing the (meth)acryl-based polymer. For example, when the (meth)acryl-based polymer is produced by radiation polymerization or the like, the content of the (meth)acrylate represented by $CH_2=C(R^1)COOR^2$ is preferably more than 0% by weight to 80% by weight, more preferably from 20 to 50% by weight, based on the total weight of all monomers, in view of adhesive properties. In this case, the content of the alkyl (meth)acrylate having a branched alkyl group of 10 to 24 carbon atoms at the ester end is preferably from 20 to 80% by weight, more preferably from 30 to 70% by weight, based on the total weight of all monomers.

Other copolymerizable monomers that may also be used include vinyl monomers such as vinyl acetate, vinyl propionate, styrene, α-methylstyrene, N-vinylpyrrolidone, N-vinyl-ε-caprolactam; glycol acrylic ester monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth)acrylate, fluoro(meth)acrylate, silicone (meth)acrylate, and 2-methoxyethyl acrylate; amide group-containing monomers, amino group-containing monomers, imide group-containing monomers, N-acryloylmorpholine, and vinyl ether monomers. Cyclic structure-containing monomers such as terpene (meth)acrylate and dicyclopentanyl (meth)acrylate may also be used as copolymerizable monomers.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In the invention, if necessary, the monomer component used to form the (meth)acryl-based polymer may contain a polyfunctional monomer for controlling the cohesive strength of the pressure-sensitive adhesive in addition to the monofunctional monomers listed above.

The polyfunctional monomer is a monomer having at least two polymerizable functional groups with an unsaturated double bond such as (meth)acryloyl group or vinyl group, and examples thereof include ester compounds of a polyhydric alcohol with (meth)acrylic acid such as (poly)ethylene glycol di(meth)acrylate, (poly)propylene glycol di(meth)acrylate, neopentyl glycol di(meth)acrylate, pentaerythritol di (meth)acrylate, pentaerythritol tri (meth)acrylate, dipentaerythritol hexa(meth)acrylate, 1,2-ethyleneglycol di(meth)acrylate, 1,6-hexanediol di(meth)acrylate, 1,12-dodecanediol di(meth)acrylate, trimethylolpropane tri (meth)acrylate, tetramethylolmethane tri(meth)acrylate; allyl (meth)acrylate, vinyl (meth)acrylate, divinylbenzene, epoxy acrylate, polyester acrylate, urethane acrylate, butanediol di(meth)acrylate, hexanediol di(meth)acrylate, and the like. Among them, trimethylolpropane tri(meth)acrylate, hexanediol di(meth)acrylate, and dipentaerythritol hexa (meth)acrylate can be preferably used. The polyfunctional monomer can be used alone or in combination of two or more.

The content of the polyfunctional monomer, if used, is preferably 3% by weigh or less, more preferably 2% by weight or less, even more preferably 1% by weight or less, based on the total weight of the monomer component used to form the (meth)acryl-based polymer, although it varies with the molecular weight of the monomer, the number of the functional groups, or other conditions. When the polyfunctional monomer is used in a content of more than 3% by weight, the pressure-sensitive adhesive may have too high cohesive strength and thus have lower adhesive strength.

In the invention, the (meth)acryl-based polymer preferably has a Tg of −70 to 0° C., more preferably −65 to −10° C. When such a (meth)acryl-based polymer is used, a pressure-sensitive adhesive with good heat resistance can be finally obtained. The Tg of the (meth)acryl-based polymer is the theoretical value calculated from the FOX equation taking into account the types and contents of the monomer units of the (meth)acryl-based polymer.

The (meth)acryl-based polymer described above can be produced using a method appropriately selected from known production methods, such as solution polymerization, radiation polymerization such as UV polymerization, bulk polymerization, and various radical polymerization methods including emulsion polymerization. The resultant (meth) acryl-based polymer may be any of a random copolymer, a block copolymer, a graft copolymer, or any other form.

Any appropriate polymerization initiator, chain transfer agent, emulsifying agent and so on may be selected and used for radical polymerization. The (meth)acrylic polymer may be controlled by the reaction conditions including the amount of addition of the polymerization initiator or the chain transfer agent. The amount of the addition may be controlled as appropriate depending on the type of these materials.

In a solution polymerization process and so on, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Examples of the thermal polymerization initiator used for the solution polymerization process include, but are not limited to, azo initiators such as 2,2'-azobisisobutyronitrile, 2,2'-azobis-2-methylbutyronitrile, 2,2'-azobis(2-methylpropionic acid)dimethyl, 4,4'-azobis-4-cyanovaleric acid, azobisisovaleronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl) peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The content of the polymerization initiator is preferably from about 0.005 to 1 part by weight, even more preferably from about 0.02 to about 0.5 parts by weight, based on 100 parts by total weight of the monomer component.

For example, when 2,2'-azobisisobutyronitrile is used as a polymerization initiator for the production of the (meth) acryl-based polymer with the above weight average molecular weight, the polymerization initiator is preferably used in a content of about 0.2 parts by weight or less, more preferably of from about 0.06 to about 0.2 parts by weight, further more preferably of from about 0.08 to about 0.175 parts by weight, based on 100 parts by total weight of the monomer component.

Examples of the chain transfer agent include lauryl mercaptan, glycidyl mercaptan, mercaptoacetic acid, 2-mercaptoethanol, thioglycolic acid, 2-ethylhexyl thioglycolate and 2,3-dimercapto-1-propanol. One of these chain transfer agents may be used alone, or two or more thereof may be used in a mixture. The total content of the chain transfer agent is preferably about 0.1 parts by weight or less, based on 100 parts by total weight of the monomer component.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by ADEKA COORPORATION). The reactive emulsifier is preferred, because after polymerization, it can be incorporated into a polymer chain to improve water resistance. Based on 100 parts by total weight of the monomer component, the emulsifier is preferably used in a content of 0.3 to 5 parts by weight, more preferably of 0.5 to 1 part by weight, in view of polymerization stability or mechanical stability.

The (meth)acryl-based polymer can also be produced by radiation polymerization, in which radiation, such as electron beams or UV rays, is applied to the monomer component. When electron beams are used in the radiation polymerization, there is no particular need to add a photopolymerization initiator to the monomer component. When UV polymerization is used as the radiation polymerization, however, a photopolymerization initiator may be added to the monomer component, which is advantageous particularly in that the polymerization time can be reduced. Any of the photopolymerization initiators may be used alone or in combination of two or more.

The photopolymerization initiator is not particularly limited as long as it can initiate photopolymerization, and photopolymerization initiators that are usually used can be employed. Examples thereof that can be used include benzoin ether-based photopolymerization initiator, acetophenone-based photopolymerization initiator, α-ketol-based photopolymerization initiator, aromatic sulfonyl chloride-based photopolymerization initiator, photoactive oxime-based photopolymerization initiator, benzoin-based photopolymerization initiator, benzyl-based photopolymerization initiator, benzophenone-based photopolymerization initiator, ketal-based photopolymerization initiator, thioxanthone-based photopolymerization initiator, acylphosphine oxide-based photopolymerization initiator, and the like.

Specific examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one (trade name: IRGACURE 651, manufactured by BASF), anisoin methyl ether, and the like. Examples of the acetophenone-based photopolymerization initiator include 1-hydroxycyclohexyl phenyl ketone (trade name: IRGACURE 184, manufactured by BASF), 4-phenoxydichloroacetophenone, 4-t-butyl-dichloroacetophenone, 1-[4-(2-hydroxyethoxy)-phenyl]-2-hydroxy-2-methyl-1-propan-1-one (trade name: IRGACURE 2959, manufactured by BASF), 2-hydroxy-2-methyl-1-phenyl-propan-1-one (trade name: DAROCUR 1173, manufactured by BASF), methoxyacetophenone, and the like. Examples of the α-ketol-based photopolymerization initiator include 2-methyl-2-hydroxypropiophenone, 1-[4-(2-hydroxyethyl)-phenyl]-2-hydroxy-2-methylpropan-1-one, and the like. Examples of the aromatic sulfonyl chloride-based photopolymerization initiator include 2-naphthalene sulfonyl chloride and the like. Examples of the photoactive oxime-based photopolymerization initiator include 1-phenyl-1,2-propanedione-2-(O-ethoxycarbonyl)-oxime, and the like.

Examples of the benzoin-based photopolymerization initiator include benzoin and the like. Examples of the benzyl-based photopolymerization initiator include benzyl and the like. Examples of the benzophenone-based photopolymerization initiators include benzophenone, benzoylbenzoic acid, 3,3'-dimethyl-4-methoxybenzophenone, polyvinyl benzophenone, α-hydroxycyclohexyl phenyl ketone, and the like. Examples of the ketal-based photopolymerization initiator include benzyl dimethyl ketal and the like. Examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone and the like.

Examples of the acylphosphine oxide-based photopolymerization initiator include bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropan-1-yl)phosphine oxide, bis(2-methoxybenzoyl)(1-methylpropan-1-yl)phosphine oxide, bis(2,6-diethoxybenzoyl)(2-methylpropan-1-yl)phosphine oxide, bis(2,6-diethoxybenzoyl)(1-methylpropan-1-yl)phosphine oxide, bis(2,6-dibutoxybenzoyl)(2-methylpropan-1-yl)phosphine oxide, bis(2,4-dimethoxybenzoyl)(2-methylpropan-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, and the like.

The content of the photopolymerization initiator is not particularly limited, but is preferably 0.01 to 5 parts by weight, more preferably 0.05 to 3 parts by weight, furthermore preferably 0.05 to 1.5 parts by weight, and particularly preferably 0.1 to 1 part by weight, based on 100 parts by total weight of the monomer component.

If the photopolymerization initiator is used in an amount of less than 0.01 parts by weight, the polymerization reaction may be insufficient. If the photopolymerization initiator is used in an amount of more than 5 parts by weight, the photopolymerization initiator may absorb ultraviolet rays, so that ultraviolet rays may fail to reach the inside of the pressure-sensitive adhesive layer. In this case, the degree of polymerization may decrease, or a polymer with a lower molecular weight may be produced. This may cause the resulting pressure-sensitive adhesive layer to have lower cohesive strength, so that in the process of peeling off the pressure-sensitive adhesive layer from a film, the pressure-sensitive adhesive layer may partially remain on the film, which may make it impossible to reuse the film. The photopolymerization initiators may be used singly or in combination of two or more.

In the invention, the (meth)acryl-based polymer preferably has a weight average molecular weight of 400,000 to 2,500,000, more preferably 600,000 to 2,200,000. When the weight average molecular weight is more than 400,000, the pressure-sensitive adhesive layer can have satisfactory durability and can have a cohesive strength small enough to suppress adhesive residue. On the other hand, if the weight average molecular weight is more than 2,500,000, bonding ability or adhesive strength may tend to be lower. In this case, the pressure-sensitive adhesive may form a solution with too high a viscosity, which may be difficult to apply. As used herein, the term "weight average molecular weight" refers to a polystyrene-equivalent weight average molecular weight, which is determined using gel permeation chromatography (GPC). It should be noted that the molecular weight of the (meth)acryl-based polymer obtained by radiation polymerization would be difficult to measure.

<Measurement of Weight Average Molecular Weight>

The weight average molecular weight of the obtained (meth)acryl-based polymer was measured by gel permeation chromatography (GPC) as follows. The polymer sample was dissolved in tetrahydrofuran to form a 0.1% by weight solution. After allowed to stand overnight, the solution was filtered through a 0.45 μm membrane filter, and the filtrate was used for the measurement.

Analyzer: HLC-8120GPC manufactured by TOSOH CORPORATION
Columns: (meth)acryl-based polymer, GM7000H$_{XL}$+GMH$_{XL}$+GMH$_{XL}$, manufactured by TOSOH CORPORATION, aromatic-based polymer, G3000HXL+2000HXL+G1000HXL, manufactured by TOSOH CORPORATION
Column size: each 7.8 mmφ×30 cm, 90 cm in total
Eluent: tetrahydrofuran (concentration 0.1% by weight)
Flow rate: 0.8 ml/minute
Inlet pressure: 1.6 MPa
Detector: differential refractometer (RI)
Column temperature: 40° C.
Injection volume: 100 μl
Standard sample: polystyrene The pressure-sensitive adhesive of the invention may contain a crosslinking agent. Examples of the crosslinking agents include an isocyanate crosslinking agent, an epoxy crosslinking agent, a silicone crosslinking agent, an oxazoline crosslinking agent, an aziridine crosslinking agent, a silane crosslinking agent, an alkyl etherified melamine crosslinking agent, a metallic chelate crosslinking agent and a peroxide. Such crosslinking agents may be used alone or in combination of two or more. An isocyanate crosslinking agent or an epoxy crosslinking agent is preferably used as the crosslinking agent.

These crosslinking agents may be used alone or in a mixture of two or more. The total content of the crosslinking agent(s) is preferably 5 parts by weight or less, more preferably 0.01 to 5 parts by weight, even more preferably 0.01 to 4 parts by weight, still more preferably 0.02 to 3 parts by weight, based on 100 parts by weight of the (meth)acryl-based polymer.

The term "isocyanate crosslinking agent" refers to a compound having two or more isocyanate groups (which may include functional groups that are temporarily protected with an isocyanate blocking agent or by oligomerization and are convertible to isocyanate groups) per molecule.

Isocyanate crosslinking agents include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of isocyanate crosslinking agents include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: CORONATE L, manufactured by NIPPON POLYURETHANE INDUSTRY CO., LTD.), a trimethylolpropane-hexamethylene diisocyanate trimer adduct (trade name: CORONATE HL, manufactured by NIPPON POLYURETHANE INDUSTRY CO., LTD.), and an isocyanurate of hexamethylene diisocyanate (trade name: CORONATE HX, manufactured by NIPPON POLYURETHANE INDUSTRY CO., LTD.); a trimethylolpropane adduct of xylylene diisocyanate (trade name: D110N, manufactured by Mitsui Chemicals, Inc.) and a trimethylolpropane adduct of hexamethylene diisocyanate (trade name: D160N, manufactured by Mitsui Chemicals, Inc.); polyether polyisocyanate and polyester polyisocyanate; adducts thereof with various polyols; and polyisocyanates polyfunctionalized with an isocyanurate bond, a biuret bond, an allophanate bond, or the like. In particular, aliphatic isocyanates are preferably used because of their high reaction speed.

These isocyanate crosslinking agents may be used alone or in a mixture of two or more. The total content of the isocyanate crosslinking agent(s) is preferably 0.01 to 5 parts by weight, more preferably 0.01 to 4 parts by weight, further more preferably 0.02 to 3 parts by weight, based on 100 parts by weight of the (meth)acryl-based polymer. The content may be appropriately determined taking into account cohesive strength, the ability to prevent delamination in a durability test, or other properties.

When an aqueous dispersion of a modified (meth)acryl-based polymer produced by emulsion polymerization is used, the isocyanate crosslinking agent does not have to be used. If necessary, however, a blocked isocyanate crosslinking agent may also be used in such a case, because the isocyanate crosslinking agent itself can easily react with water.

The term "epoxy crosslinking agent" refers to a polyfunctional epoxy compound having two or more epoxy groups per molecule. Examples of the epoxy crosslinking agent include bisphenol A, epichlorohydrin-type epoxy resin, ethylene glycol diglycidyl ether, N,N,N',N'-tetraglycidyl-m-xylenediamine, diglycidylaniline, N,N-diamino glycidyl amine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerine diglycidyl ether, glycerine triglycidyl ether, polyglycerol polyglycidyl ether, sorbitan polyglycidyl ether, trimethylolpropane polyglycidyl ether, diglycidyl adipate, diglycidyl o-phthalate, triglycidyl tris(2-hydroxyethyl) isocyanurate, resorcin diglycidyl ether, bisphenol-S diglycidyl ether, and epoxy resins having two or more epoxy groups in the molecule. The epoxy crosslinking agent may also be a commercially available product such as TETRAD-C (trade name) or TETRAD-X (trade name) manufactured by MITSUBISHI GAS CHEMICAL COMPANY, INC.

These epoxy crosslinking agents may be used alone or in a mixture of two or more. The total content of the epoxy crosslinking agent(s) is preferably 0.01 to 5 parts by weight, more preferably 0.01 to 4 parts by weight, further more preferably 0.02 to 3 parts by weight, based on 100 parts by weight of the (meth)acryl-based polymer. The content may be appropriately determined taking into account cohesive strength, the ability to prevent delamination in a durability test, or other properties.

Any peroxide crosslinking agents capable of generating active radical species by heating and promoting the crosslinking of the base polymer in the pressure-sensitive adhesive may be appropriately used. In view of workability and stability, a peroxide with a one-minute half-life temperature of 80° C. to 160° C. is preferably used, and a peroxide with a one-minute half-life temperature of 90° C. to 140° C. is more preferably used.

Examples of the peroxide for use in the invention include di(2-ethylhexyl) peroxydicarbonate (one-minute half-life temperature: 90.6° C.), di(4-tert-butylcyclohexyl)peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl)peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half lifetime obtained at a certain temperature are shown in catalogs furnished by manufacturers, such as "Organic Peroxide Catalog, 9th Edition, May, 2003" furnished by NOF CORPORATION.

One of the peroxide crosslinking agents may be used alone, or a mixture of two or more of the peroxide crosslinking agent may be used. The total content of the peroxide(s) is preferably from 0.02 to 2 parts by weight, more preferably from 0.05 to 1 part by weight, based on 100 parts by weight of the (meth)acrylic polymer. The content of the peroxide(s) may be appropriately selected in this range in order to control the workability, reworkability, crosslink stability or peeling properties.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

As the crosslinking agent, a polyfunctional metal chelate may also be used in combination with an organic crosslinking agent. Examples of the polyfunctional metal chelate may include a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The pressure-sensitive adhesive of the invention may contain a (meth)acryl-based oligomer in view of improving adhesive strength. The (meth)acryl-based oligomer is preferably a polymer having a Tg higher than that of the (meth)acryl-based polymer according to the invention and having a weight average molecular weight lower than that of the (meth)acryl-based polymer according to the invention. The (meth)acryl-based oligomer functions as a tackifying resin and is advantageous in increasing adhesive strength without raising dielectric constant.

The (meth)acryl-based oligomer may have a Tg of from about 0° C. to about 300° C., preferably from about 20° C. to about 300° C., more preferably from about 40° C. to about 300° C. When the Tg falls within the range, the adhesive strength can be improved. Like the Tg of the (meth)acryl-based polymer, the Tg of the (meth)acryl-based oligomer is the theoretical value calculated from the Fox equation.

The (meth)acryl-based oligomer may have a weight average molecular weight of 1,000 to less than 30,000, preferably 1,500 to less than 20,000, more preferably 2,000 to less than 10,000. If the oligomer has a weight average molecular weight of 30,000 or more, the effect of improving adhesive strength cannot be sufficiently obtained in some cases. The oligomer with a weight average molecular weight of less than 1,000 may lower the adhesive strength or holding performance because of its relatively low molecular weight. In the invention, the weight average molecular weight of the (meth)acryl-based oligomer can be determined as a polystyrene-equivalent weight average molecular weight by GPC method. More specifically, the weight average molecular weight can be determined using HPLC 8020 with two TSKgel GMH-H (20) columns manufactured by TOSOH CORPORATION under the conditions of a solvent of tetrahydrofuran and a flow rate of about 0.5 ml/minute.

Examples of monomers that may be used to form the (meth)acryl-based oligomer include alkyl (meth)acrylate such as methyl (meth)acrylate, ethyl (meth)acrylate, propyl (meth)acrylate, isopropyl (meth)acrylate, butyl (meth)acrylate, isobutyl (meth)acrylate, sec-butyl (meth)acrylate, tert-butyl (meth)acrylate, pentyl (meth)acrylate, isopentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, or dodecyl (meth)acrylate; an ester of (meth)acrylic acid and an alicyclic alcohol, such as cyclohexyl (meth)acrylate or isobornyl (meth)acrylate; aryl (meth)acrylate such as phenyl (meth)acrylate or benzyl (meth)acrylate; and a (meth)acrylate derived from a terpene compound derivative alcohol. These (meth)acrylates may be used alone or in combination of two or more.

The (meth)acryl-based oligomer preferably contains, as a monomer unit, an acrylic monomer having a relatively bulky structure, typified by an alkyl (meth)acrylate whose alkyl group has a branched structure, such as isobutyl (meth)acrylate or tert-butyl (meth)acrylate; an ester of (meth)acrylic acid and an alicyclic alcohol, such as cyclohexyl (meth)acrylate or isobornyl (meth)acrylate; or aryl (meth)acrylate such as phenyl (meth)acrylate or benzyl (meth)acrylate, or any other cyclic structure-containing (meth)acrylate. The use of a (meth)acryl-based oligomer with such a bulky structure can further improve the tackiness of the pressure-sensitive adhesive layer. In terms of bulkiness, cyclic structure-containing oligomers are highly effective, and oligomers having two or more rings are more effective. When ultraviolet (UV) light is used in the process of synthesizing the (meth)acryl-based oligomer or forming the pressure-sensitive adhesive layer, a saturated oligomer is preferred because such an oligomer is less likely to inhibit polymerization, and an alkyl (meth)acrylate whose alkyl group has a branched structure or an ester of an alicyclic alcohol and (meth)acrylic acid is preferably used as a monomer to form the (meth)acryl-based oligomer.

From these points of view, preferred examples of the (meth)acryl-based oligomer include a copolymer of cyclohexyl methacrylate (CHMA) and isobutyl methacrylate (IBMA), a copolymer of cyclohexyl methacrylate (CHMA) and isobornyl methacrylate (IBXMA), a copolymer of cyclohexyl methacrylate (CHMA) and acryloyl morpholine (ACMO), a copolymer of cyclohexyl methacrylate (CHMA) and diethylacrylamide (DEAA), a copolymer of 1-adamanthyl acrylate (ADA) and methyl methacrylate (MMA), a copolymer of dicyclopentanyl methacrylate (DCPMA) and isobornyl methacrylate (IBXMA), and a homopolymer of each of dicyclopentanyl methacrylate (DCPMA), cyclohexyl methacrylate (CHMA), isobornyl methacrylate (IBXMA), isobornyl acrylate (IBXA), a copolymer of dicyclopentanyl methacrylate (DCPMA) and methyl methacrylate (MMA), dicyclopentanyl acrylate (DCPA), 1-adamanthyl methacrylate (ADMA), and 1-adamanthyl acrylate (ADA). In particular, an oligomer composed mainly of CHMA is preferred.

In the pressure-sensitive adhesive of the invention, the content of the (meth)acryl-based oligomer is preferably, but not limited to, 70 parts by weight or less, more preferably from 1 to 70 parts by weight, even more preferably from 2 to 50 parts by weight, still more preferably from 3 to 40 parts by weight, based on 100 parts by weight of the (meth)acryl-based polymer. If the content of the (meth)acryl-based oligomer is more than 70 parts by weight, a problem may occur such as an increase in elastic modulus or a decrease in tackiness at low temperature. Adding 1 part by weight or more of the (meth)acryl-based oligomer is effective in improving adhesive strength.

The pressure-sensitive adhesive of the invention may further contain a silane coupling agent for improving water resistance at the interface between the pressure-sensitive adhesive layer and a hydrophilic adherend, such as glass, bonded thereto. The content of the silane coupling agent is preferably 1 part by weight or less, more preferably from 0.01 to 1 part by weight, even more preferably from 0.02 to 0.6 parts by weight, based on 100 parts by weight of the (meth)acryl-based polymer. If the content of the silane coupling agent is too high, the adhesive may have a higher adhesive strength to glass so that it may be less removable from glass. If the content of the silane coupling agent is too low, the durability of the adhesive may undesirably decrease.

Examples of silane coupling agent preferably can be used include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, 3-triethoxysilyl-N-(1,3-dimethylbutylidene)propylamine and N-phenyl-γ-aminopropyltrimethoxysilane; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

The pressure-sensitive adhesive composition of the invention may also contain any other known additive. For example, a powder such as a colorant and a pigment, a dye, a surfactant, a plasticizer, a tackifier, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use.

The pressure-sensitive adhesive layer of the invention is made from the pressure-sensitive adhesive described above. The thickness of the pressure-sensitive adhesive layer is typically, but not limited to, about 1 to about 400 µm. The preferred range of the thickness of the pressure-sensitive adhesive layer may be appropriately determined depending on the method of producing the (meth)acryl-based polymer used to form the pressure-sensitive adhesive. For example, when the (meth)acryl-based polymer is produced by solution polymerization or the like, the thickness of the pressure-sensitive adhesive layer is preferably from 1 to 100 µm, more preferably from 2 to 50 µm, even more preferably from 2 to 40 µm, still more preferably from 5 to 35 µm. When the (meth)acryl-based polymer is produced by radiation polymerization or the like, the thickness of the pressure-sensitive adhesive layer is preferably from 50 to 400 µm, more preferably from 75 to 300 µm, even more preferably from 100 to 200 µm.

The pressure-sensitive adhesive layer of the invention preferably has a relative dielectric constant of 3.5 or less, more preferably 3.3 or less, even more preferably 3.2 or less, still more preferably 3.0 or less at a frequency of 100 kHz.

The pressure-sensitive adhesive layer of the invention preferably has a gel fraction of 20 to 98% by weight. The gel fraction of the pressure-sensitive adhesive layer is more preferably from 30 to 98% by weight, even more preferably from 40 to 95% by weight. When the pressure-sensitive adhesive contains a crosslinking agent, the gel fraction can be controlled by adjusting the total amount of the crosslinking agent(s) added, taking carefully into account the effect of the crosslinking treatment temperature and the crosslinking treatment time. As the gel fraction decreases, the cohesive strength may decrease. As the gel fraction excessively increases, the adhesive strength may degrade. The pressure-sensitive adhesive layer having a gel fraction in such a range is characterized in that it shows only a very small increase in adhesive strength after bonded to an adherend and that it can be easily removed from the adherend without leaving adhesive residue even after bonded thereto for a long period of time.

The pressure-sensitive adhesive layer of the invention preferably has a haze value of 2% or less when having a thickness of 25 µm. The pressure-sensitive adhesive layer with a haze value of 2% or less can satisfy the requirements for transparency when it is used on optical members. The haze value is preferably from 0 to 1.5%, more preferably from 0 to 1%. A haze value of 2% or less is a satisfactory level for optical applications. If the haze value is more than 2%, cloudiness may occur, which is not preferred for optical film applications.

For example, the pressure-sensitive adhesive layer may be formed by a method including applying the pressure-sensitive adhesive to a support, removing the polymerization solvent and so on by drying to form a pressure-sensitive adhesive sheet. Before the pressure-sensitive adhesive is applied, appropriately at least one solvent other than the polymerization solvent may be added to the pressure-sensitive adhesive.

Various methods may be used to apply the pressure-sensitive adhesive layer. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The heat drying temperature is preferably from 40° C. to 200° C., more preferably from 50° C. to 180° C., in particular, preferably from 70° C. to 170° C. Setting the heating temperature within the above range makes it possible to obtain a pressure-sensitive adhesive layer having good adhesive properties. The drying time may be any appropriate period of time. The drying time is preferably from 5 seconds to 20 minutes, more preferably from 5 seconds to 10 minutes, in particular, preferably from 10 seconds to 5 minutes.

When the (meth)acryl-based polymer according to the invention is produced by ultraviolet irradiation of the monomer component to be polymerized, the pressure-sensitive adhesive layer may be formed while the (meth)acryl-based polymer is produced from the monomer component. Appropriate materials such as a crosslinking agent and other materials that may be added to the pressure-sensitive adhesive may also be mixed with the monomer component. Before the ultraviolet irradiation, the monomer component may be partially polymerized to form a syrup before use.

The ultraviolet irradiation may be performed using a high-pressure mercury lamp, a low-pressure mercury lamp, a metal halide lamp, or the like.

For example, a release-treated sheet may be used as the support. A silicone release liner is preferably used as the release-treated sheet.

In the pressure-sensitive adhesive sheet include the layer pressure-sensitive adhesive layer formed on the release-treated sheet, when the pressure-sensitive adhesive layer is exposed, the pressure-sensitive adhesive layer may be protected with the release-treated sheet (a separator) before practical use. The release-treated sheet is peeled off before actual use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 µm, preferably from about 5 to about 100 µm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

The pressure-sensitive adhesive layer and the pressure-sensitive adhesive sheet of the invention are suitable for use on optical members, and particularly in optical applications, they are preferably used and bonded to metal thin layers or metal electrodes. Metal thin layers include thin layers of metal, metal oxide, or a mixture of metal and metal oxide, and examples of metal thin layers include, but are not limited to, thin layers of ITO (indium tin oxide), ZnO, SnO, and CTO (cadmium tin oxide). The thickness of metal thin layers is typically, but not limited to, about 10 to 200 nm. Usually, for example, a metal thin layer such as an ITO layer is provided on a transparent plastic film substrate such as a polyethylene terephthalate film (specifically, a PET film) to form a transparent conductive film for use. When the pressure-sensitive adhesive sheet of the invention is bonded to a metal thin layer, the surface of the pressure-sensitive adhesive layer is preferably used as a bonding surface to the metal thin layer.

The metal electrodes may be made of metal, metal oxide, or a mixture of metal and metal oxide, and examples include, but are not limited to, ITO, silver, copper, and carbon nanotube (CNT) electrodes.

A specific example of the use of the pressure-sensitive adhesive sheet of the invention is a touch panel-forming pressure-sensitive adhesive sheet, which is used in the manufacture of a touch panel. For example, the touch panel-forming pressure-sensitive adhesive sheet is used in the manufacture of a capacitance touch panel, where it is used to bond a transparent conductive film having a metal thin layer such as an ITO layer to a poly (methyl methacrylate) (PMMA) resin sheet, a hard-coated film, a glass lens, or any other material. Applications of the touch panel include, but are not limited to, cellular phones, tablet computers, and personal digital assistances.

FIG. 1 shows a more specific example of the use of the pressure-sensitive adhesive layer or the pressure-sensitive adhesive sheet of the invention, which is an example of a capacitance touch panel. FIG. 1 shows a capacitance touch panel 1 including a decorative panel 11, pressure-sensitive adhesive layers or pressure-sensitive adhesive sheets 12, ITO films 13, and a hard coated film 14. The decorative panel 11 is preferably a glass plate or a transparent acrylic plate (PMMA plate). Each ITO films 13 preferably includes a glass sheet or a transparent plastic film (specifically, a PET film) and an ITO layer provided thereon. The hard coated film 14 is preferably a hard coated transparent plastic film such as a hard coated PET film. The capacitance touch panel 1 having the pressure-sensitive adhesive layer or the pressure-sensitive adhesive sheet of the invention can be made thinner and more stable in operation. The capacitance touch panel 1 also has a good appearance and good visibility.

An optical member may be used as the support of the pressure-sensitive adhesive sheet of the invention. The pressure-sensitive adhesive layer can be formed by a process including applying the pressure-sensitive adhesive directly to an optical member and drying the adhesive to remove the polymerization solvent and the like, so that the pressure-sensitive adhesive layer is formed on the optical member. Alternatively, the pressure-sensitive adhesive layer may be formed on a release-treated separator and then transferred to an optical member as needed to form a pressure-sensitive adhesive optical member.

The release-treated sheet used in the preparation of the pressure-sensitive adhesive optical member may be used by itself as a separator for the pressure-sensitive adhesive optical member, so that the process can be simplified.

The process for forming the pressure-sensitive adhesive layer for the pressure-sensitive adhesive optical member may further include forming an anchor layer on the surface of the optical member or performing any adhesion-facilitating treatment such as a corona treatment or a plasma treatment before forming the pressure-sensitive adhesive layer. The surface of the pressure-sensitive adhesive layer may also be subjected to an adhesion-facilitating treatment.

The pressure-sensitive adhesive optical member of the invention may be used as a pressure-sensitive adhesive layer-carrying transparent conductive film, which is produced using a transparent conductive film as an optical member. The transparent conductive film includes a transparent plastic film substrate and a transparent conductive thin layer that is formed of a metal thin layer such as the ITO layer on one surface of the substrate. The pressure-sensitive adhesive layer of the invention is provided on the other surface of the transparent plastic film substrate. The transparent conductive thin layer may be provided on the transparent plastic film substrate with an undercoat layer interposed therebetween. Two or more undercoat layers may be provided. An oligomer migration-preventing layer may be provided between the transparent plastic film substrate and the pressure-sensitive adhesive layer.

The transparent plastic film substrate to be used may be, but not limited to, various transparent plastic films. The plastic film is generally formed of a monolayer film. Examples of the material for the transparent plastic film substrate include polyester resins such as polyethylene terephthalate and polyethylene naphthalate, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred. The film substrate preferably has a thickness of 15 to 200 μm.

The surface of the film substrate may be previously subject to sputtering, corona discharge treatment, flame treatment, ultraviolet irradiation, electron beam irradiation, chemical treatment, etching treatment such as oxidation, or undercoating treatment such that the adhesion of the transparent conductive thin layer or the undercoat layer formed thereon to the transparent plastic film substrate can be improved. If necessary, the film substrate may also be subjected to dust removing or cleaning by solvent cleaning, ultrasonic cleaning or the like, before the transparent conductive thin layer or the undercoat layer is formed.

The material and thickness of the transparent conductive thin layer are not restricted and may be those described for the metal thin layer. The undercoat layer may be made of an inorganic material, an organic material or a mixture of an inorganic material and an organic material. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses is the refractive index of each material. In particular, $SiO_2$, $MgF_2$, $Al_2O_3$, or the like is preferably used. In particular, $SiO_2$ is preferred. Besides the above, a complex oxide containing about 10 to about 40 parts by weight of cerium oxide and about 0 to about 20 parts by weight of tin oxide based on 100 parts by weight of the indium oxide may also be used.

Examples of the organic material include acrylic resins, urethane resins, melamine resins, alkyd resins, siloxane polymers, and organosilane-based condensates. At least one of these organic materials may be used. In particular, a thermosetting resin including a mixture composed of a melamine resin, an alkyd resin and an organosilane condensate is preferably used as the organic material.

The thickness of the undercoat layer is generally, but not limited to, from about 1 to about 300 nm, preferably from 5 to 300 nm, in view of optical design and the effect of preventing the release of an oligomer from the film substrate.

The pressure-sensitive adhesive layer-carrying transparent conductive film can be used to form various devices such as touch panels and liquid crystal display devices. In particular, the pressure-sensitive adhesive layer-carrying transparent conductive film is preferably used as a touch panel-forming electrode sheet. The touch panel is suitable for use in different types of detection (such as resistive and capacitance types).

A capacitance touch panel usually includes a transparent conductive film that has a transparent conductive thin layer in a specific pattern and is formed over the surface of a display unit. The pressure-sensitive adhesive layer-carrying transparent conductive film is a laminate in which the pressure-sensitive adhesive layer and the patterned transparent conductive thin layer are appropriately stacked facing each other.

The pressure-sensitive adhesive optical member of the invention may be used as a pressure-sensitive adhesive layer-carrying optical film, which is produced using an image display-forming optical film as the optical member.

The optical film may be of any type for use in forming image display devices such as liquid crystal display devices and organic electro-luminescent (EL) display devices. For example, a polarizing plate is exemplified as the optical film. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Further an optical film of the invention may be used as other optical layers, such as a reflective plate, a transflective plate, a retardation plate (a half wavelength plate and a quarter wavelength plate included), an optical compensation film and a viewing angle compensation film, which may be used for formation of a liquid crystal display device etc. These are used in practice as an optical film, or as one layer or two layers or more of optical layers laminated with polarizing plate.

Although an optical film with the above described optical layer laminated to the polarizing plate may be formed by a method in which laminating is separately carried out sequentially in manufacturing process of a liquid crystal display device etc., an optical film in a form of being laminated beforehand has an outstanding advantage that it has excellent stability in quality and assembly workability, etc., and thus manufacturing processes ability of a liquid crystal display device etc. may be raised. Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

The pressure-sensitive adhesive layer-carrying optical film of the invention is preferably used to form various types of image display devices such as liquid crystal display devices. Liquid crystal display devices may be formed according to conventional techniques. Specifically, liquid crystal display devices are generally formed by appropriately assembling a liquid crystal cell and the pressure-sensitive adhesive layer-carrying optical film and optionally other component such as a lighting system and incorporating a driving circuit according to any conventional technique, except that the pressure-sensitive layer-carrying adhesive optical film of the invention is used. Any type of liquid crystal cell may also be used such as a TN type, an STN type, a π type a VA type and IPS type.

Suitable liquid crystal display devices, such as liquid crystal display device with which the pressure-sensitive adhesive layer-carrying optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display device, suitable parts, such as diffusion plate, anti-glare layer, antireflection film, protective plate, prism array, lens array sheet, optical diffusion plate, and backlight, may be installed in suitable position in one layer or two or more layers.

EXAMPLES

The invention is more specifically described by the examples below, which are not intended to limit the scope of the invention. The measurements described below were performed for the evaluation items in the examples and so on.

Example 1

<Preparation of (Meth)acryl-Based Polymer>

To a four-neck flask equipped with a stirring blade, a thermometer, a nitrogen gas introducing tube, and a condenser were added 100 parts by weight of isodecyl methacrylate (IDA), 1 parts by weight of 4-hydroxybutyl acrylate (HBA), 0.1 parts by weight of 2,2'-azobisisobutyronitrile as a polymerization initiator, and 200 parts by weight of ethyl acetate. Nitrogen gas was introduced for 1 hour to replace the air while the mixture was gently stirred, and then a polymerization reaction was performed for 15 hours while the temperature of the liquid in the flask was kept at about 55 to about 60° C., so that a 800,000 of weight average molecular weight of (meth)acryl-based polymer solution was obtained. The (meth)acryl-based polymer had a Tg of −60° C.

To the resulting (meth)acryl-based polymer solution were added 0.5 parts by weight of a trimethylolpropane adduct of xylylene diisocyanate (D110N (trade name) manufactured by Mitsui Chemicals, Inc.) as a crosslinking agent based on 100 parts by weight of the polymer solid, so that a pressure-sensitive adhesive solution was obtained.

The resulting pressure-sensitive adhesive solution was then applied to one side of a silicone-treated, 75-μm-thick, polyethylene terephthalate (PET) film (Mitsubishi Chemmical Polyester Film Co., Ltd., DIAFOIL MRF38) so that a 25-μm-thick pressure-sensitive adhesive layer could be formed after drying. The coating was dried at 130° C. for 3 minutes to form a pressure-sensitive adhesive layer, so that a pressure-sensitive adhesive sheet was obtained.

Examples 2 to 18 and Comparative Examples 1 to 8

Pressure-sensitive adhesive sheets were prepared using the process of Example 1, except that the type and ratio of the monomers used to form the (meth)acryl-based polymer and the type and content of the crosslinking agent were changed as shown in Table 1. Tg and weight average molecular weight of the obtained (meth)acryl-based polymer are shown in Table 1.

Example 19

(Preparation of Monomer Component for Use in UV Polymerization)

To a four-neck flask were added 48 parts by weight of 2-ethylhexyl acrylate (2EHA), 48 parts of isostearyl acrylate (ISTA), 4 parts by weight of 4-hydroxybutyl acrylate (HBA), 0.05 parts by weight of each of two photopolymerization initiators (IRGACURE 184 (trade name) manufactured by BASF and IRGACURE 651 (trade name) manufactured by BASF), so that a monomer mixture was obtained. Subsequently, the monomer mixture was partially photo-polymerized by being exposed to ultraviolet rays in a nitrogen atmosphere, so that a partial polymer (acryl-based polymer syrup) was obtained with a conversion of about 10% by weight.

To 100 parts by weight of the above acryl-based polymer syrup) were added 0.1 parts by weight of trimethylolpropane triacrylate. Subsequently, these materials were uniformly mixed to form a monomer component.

<Production of Pressure-Sensitive Adhesive Layer Using UV Polymerization>

Subsequently, a 38-μm-thick polyester film (Diafoil MRF (trade name) manufactured by Mitsubishi Plastics, Inc.) with its one side release-treated with silicone was provided, and the monomer component prepared as described above was applied to the release-treated surface of the polyester film so that a coating layer with a final thickness of 100 μm could be formed. Subsequently, a 38-μm-thick polyester film (Diafoil MRE (trade name) manufactured by Mitsubishi Plastics, Inc.) with its one side release-treated with silicone was provided, and the surface of the applied monomer component was covered with the polyester film in such a manner that the release-treated surface of the film faced the coating layer. As a result, the coating layer of the monomer component was shielded from oxygen. The sheet having the coating layer obtained as described above was irradiated with ultraviolet rays from a chemical light lamp (manufactured by TOSHIBA CORPORATION) at an irradiance of 5 mW/cm$^2$ (as measured using TOPCON UVR-T1 having a maximum sensitivity at about 350 nm) for 360 seconds, so that the coating layer was cured to form a pressure-sensitive adhesive layer, and thus a pressure-sensitive adhesive sheet was formed. The polyester films placed over both sides of the pressure-sensitive adhesive layer function as release liners.

Example 20 and Comparative Example 1

Pressure-sensitive adhesive sheets were prepared using the same process as Example 1, except that the type and content of the monofunctional monomer used for the preparation of monomer component was changed as shown in Table 2.

The pressure-sensitive adhesive sheets (samples) obtained in the examples and the comparative examples were evaluated as described below. Table 1 shows the evaluation results.
<Measurement of Gel Fraction>
A predetermined amount (initial weight W1) was sampled from the pressure-sensitive adhesive layer of the pressure-sensitive adhesive sheet. The sample was immersed and stored in an ethyl acetate solution at room temperature for 1 week. The insoluble matter was then taken out and measured for dry weight (W2). The gel fraction of the sample was determined from the following formula: gel fraction=(W2/W1)×100.
<Dielectric Constant>
Pressure-sensitive adhesive layers (each obtained by peeling off the silicone-treated PET film from the pressure-sensitive adhesive sheet) were stacked 5 times to form an about 100-μm-thick laminate of the pressure-sensitive adhesive layers. The 100-μm-thick samples obtained by UV Polymerization in Examples 19, 20 and Comparative Example 1 were used without laminating. The laminate of the pressure-sensitive adhesive layers (or the pressure-sensitive adhesive layer) was sandwiched between a copper foil and an electrode and then measured for relative dielectric constant at a frequency of 100 kHz using the instrument shown below. Three samples of 30 mm×30 mm were prepared, and the average of the measurements for the three samples was determined as the dielectric constant of the samples.

The relative dielectric constant of the pressure-sensitive adhesive layer at a frequency of 100 kHz was measured under the following conditions according to JIS K 6911.
Measurement method: capacitance method (instrument: 4294A Precision Impedance Analyzer, Agilent Technologies)
Electrode structure: 12.1 mmφ, 0.5 mm thick aluminum plate
Counter electrode: 3 oz copper plate
Measurement environment: 23±1° C., 52±1% RH
<Adhesive Strength>
A 25-μm-thick, PET film (Toray industries Inc., Lumirror S10) was bonded to the pressure-sensitive adhesive surface of the sample obtained in each of the examples and the comparative examples to form an evaluation sample. The evaluation sample was cut into a piece of 20 mm in width and about 100 mm in length. The PET film was then peeled off from the sample piece. The resulting pressure-sensitive adhesive layer was bonded to a 0.5 mm thick non-alkali glass plate (1737, manufactured by Corning Incorporated) by a reciprocating motion of a 2 kg roller. After allowed to stand at room temperature (23° C.) for 1 hour, the pressure-sensitive adhesive layer was measured for peel adhesive strength at a peel angle of 90° and a peel rate of 300 mm/minute.
<Measurement of Haze and Total Light Transmittance>
The pressure-sensitive adhesive sheet obtained in each of the examples and the comparative examples was bonded to one side of a non-alkali glass plate with a total light transmittance of 93.3% and a haze of 0.1%. The haze and the total light transmittance of the resulting laminate were measured with a haze meter (MR-100 manufactured by MURAKAMI COLOR RESEARCH LABORATORY). For the measurement with the haze meter, the pressure-sensitive adhesive sheet was placed on the light source side. The haze value of the non-alkali glass, 0.1%, was subtracted from the measured value when the haze value of the pressure-sensitive adhesive sheet was determined. The measured value was used as the total light transmittance (%) of the pressure-sensitive adhesive sheet.

TABLE 1

| | Adhesive composition | | | | | | | | | |
|---|---|---|---|---|---|---|---|---|---|---|
| | (Meth)acryl-based polymer | | | Crosslinking agent | | Adhesive layer | | Evaluations | | |
| | Monomer type and composition ratio (weight ratio) | Weight average molecular weight | Tg (° C.) | Type | Content (parts by weight) | Thickness (μm) | Gel fraction (%) | Dielectric constant | Adhesive strength (N/20 mm) | Haze | Total light transmittance (%) |
| Example 1 | IDA/HBA = 100/1 | 800,000 | −60 | D110N | 0.5 | 25 | 86.3 | 2.93 | 1.2 | 0.8 | 93.3 |
| Example 2 | IMA/AA = 100/10 | 750,000 | −47 | TEDRAD-X | 0.8 | 25 | 84.2 | 2.85 | 4.7 | 0.1 | 92.5 |
| Example 3 | ID/HBA = 100/1 | 650,000 | −41 | D110N | 0.5 | 25 | 68.4 | 2.15 | 11.2 | 0.4 | 93.4 |
| Example 4 | ISTA/2EHA/HBA = 90/10/1 | 700,000 | −24 | D110N | 0.7 | 25 | 70.0 | 2.60 | 13.3 | 5.6 | 92.6 |
| Example 5 | ID/2EHA/HBA = 50/50/1 | 620,000 | −56 | D110N | 0.5 | 25 | 72.2 | 3.10 | 5.7 | 1.3 | 92.8 |
| Example 6 | ID/AA = 100/10 | 680,000 | −33 | D140N | 0.5 | 25 | 78.0 | 2.32 | 3.6 | 0.2 | 93.5 |
| Example 7 | ID/AA = 100/10 | 680,000 | −33 | TEDRAD-C | 0.3 | 25 | 90.5 | 2.30 | 4.0 | 0.2 | 93.6 |
| Example 8 | IMA/MMA/HBA = 80/20/1 | 430,000 | −36 | D110N | 0.5 | 25 | 57.0 | 2.65 | 1.9 | 2.0 | 93.0 |
| Example 9 | 2EHA/IMA/HBA = 20/80/1 | 720,000 | −59 | D110N | 0.6 | 25 | 72.5 | 3.23 | 6.7 | 0.8 | 93.0 |

TABLE 1-continued

| | Adhesive composition | | | | | Adhesive layer | | Evaluations | | | |
|---|---|---|---|---|---|---|---|---|---|---|---|
| | (Meth)acryl-based polymer | | | Crosslinking agent | | | | | | | |
| | Monomer type and composition ratio (weight ratio) | Weight average molecular weight | Tg (° C.) | Type | Content (parts by weight) | Thickness (μm) | Gel fraction (%) | Dielectric constant | Adhesive strength (N/20 mm) | Haze | Total light transmittance (%) |
| Example 10 | 2EHA/IDA/HBA = 20/80/1 | 760,000 | −62 | D110N | 0.5 | 25 | 63.9 | 3.43 | 1.5 | 0.1 | 93.6 |
| Example 11 | ID/CD420/HBA = 70/30/1 | 580,000 | −14 | D110N | 0.5 | 25 | 82.9 | 2.34 | 8.2 | 0.4 | 92.8 |
| Example 12 | IDA/MMA/HBA = 90/10/1 | 750,000 | −50 | D110N | 0.5 | 25 | 82.1 | 2.75 | 0.7 | 0.9 | 93.2 |
| Example 13 | ID/HBA = 100/20 | 680,000 | −39 | D110N | 0.4 | 25 | 75 | 3.03 | 12.5 | 0.4 | 93.3 |
| Example 14 | ISTA/2EHA/HBA = 45/55/1 | 730,000 | −49 | D110N | 0.5 | 25 | 71 | 3.18 | 10.8 | 0.8 | 92.8 |
| Example 15 | ISTA/2EHA/HBA/30/70/1 | 750,000 | −57 | D110N | 0.5 | 25 | 73.1 | 3.34 | 9.3 | 0.6 | 92.9 |
| Example 16 | ID/2EHA/HBA = 35/65/1 | 640,000 | −61 | D110N | 0.5 | 25 | 74 | 3.25 | 4.9 | 0.9 | 92.9 |
| Example 17 | ID/MMA/HBA = 90/10/1 | 610,000 | −32 | D110N | 0.5 | 25 | 65.2 | 2.22 | 9.8 | 0.7 | 93.3 |
| Example 18 | ID/CHA/HBA = 90/10/1 | 700,000 | −36 | D110N | 0.5 | 25 | 71.2 | 2.24 | 6.2 | 0.5 | 92.8 |
| Comparative Example 1 | BA/HBA = 100/3 | 860,000 | −54 | D110N | 0.5 | 25 | 87.9 | 5.30 | 3.4 | 0.2 | 93.6 |
| Comparative Example 2 | i-OA/HBA = 100/1 | 800,000 | −58 | D110N | 0.5 | 25 | 76.9 | 3.57 | 3.1 | 0.6 | 93.5 |
| Comparative Example 3 | i-AA/HBA = 100/1 | 900,000 | −45 | D110N | 0.5 | 25 | 88.7 | 4.00 | 3.8 | 0.4 | 93.0 |
| Comparative Example 4 | i-NA/HBA = 100/1 | 760,000 | −58 | D110N | 0.5 | 25 | 81.9 | 3.55 | 2.4 | 0.8 | 92.7 |
| Comparative Example 5 | 2EHA/HBA = 100/1 | 740,000 | −70 | D110N | 0.5 | 25 | 79.0 | 3.70 | 2.9 | 0.2 | 93.0 |
| Comparative Example 6 | BA/LA/HBA = 60/40/1 | 850,000 | −37 | D110N | 0.5 | 25 | 85.7 | 3.95 | 1.1 | 0.6 | 93.1 |
| Comparative Example 7 | BA/STA/HBA = 60/40/1 | 760,000 | −27 | D110N | 0.5 | 25 | 80.9 | 4.01 | 1.2 | 0.8 | 93.2 |
| Comparative Example 8 | OA/DA/HBA = 50/50/1 | 830,000 | −47 | D110N | 0.5 | 25 | 71.1 | 3.74 | 0.5 | 1.0 | 93.3 |

TABLE 2

| | Adhesive composition | | | | Adhesive layer | | Evaluations | | | |
|---|---|---|---|---|---|---|---|---|---|---|
| | Monofunctional monomer | Polyfunctional monomer | | | | | | | | |
| | Monomer type and composition ratio (weight ratio) | Type | Content (parts by weight) | (Meth)acryl-based polymer Tg (° C.) | Thickness (μm) | Gel fraction (%) | Dielectric constant | Adhesive strength (N/20 mm) | Haze | Total light transmittance (%) |
| Example 19 | 2EHA/ISTA/HBA = 48/48/4 | TMPTA | 0.1 | −44 | 100 | 92.0 | 3.03 | 9.2 | 0.4 | 92.1 |
| Example 20 | 2EHA/ISTA = 80/20 | TMPTA | 0.1 | −60 | 100 | 84.1 | 3.48 | 4.1 | 0.4 | 92.2 |
| Comparative Example 9 | 2EHA/HBA = 96/4 | TMPTA | 0.1 | −68 | 100 | 81.0 | 3.72 | 2.9 | 0.4 | 92.2 |

In Tables 1 and 2, IDA represents isodecyl acrylate (manufactured by Sartomer, homopolymer Tg=−60° C.); IMA isomyristyl acrylate (manufactured by Kyoeisha Chemical Co., Ltd., homopolymer Tg=−56° C.); ISTA isostearyl acrylate (manufactured by Osaka Organic Chemical Industry Ltd., homopolymer Tg=−18° C.); ID isodecyl methacrylate (manufactured by Kyoeisha Chemical Co., Ltd., homopolymer Tg=−41° C.); TMPTA trimethylolpropane triacrylate; i-OA isooctyl acrylate (manufactured by Osaka Organic Chemical Industry Ltd., homopolymer Tg=−58° C.); i-NA isononyl acrylate (manufactured by Osaka Organic Chemical Industry Ltd., homopolymer Tg=−58° C.); i-AA isoamyl acrylate (manufactured by Kyoeisha Chemical Co., Ltd., homopolymer Tg=−45° C.); 2EHA 2-ethylhexyl acrylate (manufactured by TOAGOSEI CO., LTD., homopolymer Tg=−70° C.); LA lauryl acrylate (manufactured by Kyoeisha Chemical Co., Ltd., homopolymer Tg=−3° C.); STA stearyl acrylate (manufactured by Osaka Organic Chemical Industry Ltd., homopolymer Tg=30° C.); AA acrylic acid; HBA 4-hydroxybutyl acrylate; BA butyl acrylate; MMA methyl methacrylate; CD420 3,3,5-trimethylcyclohexyl acrylate (manufactured by Sartomer, homopolymer Tg=81° C.); OA octyl acrylate; and DA decyl acrylate.

Tg was measured using a differential scanning calorimeter (DSC).

<Conditions>

Apparatus: Q-2000 manufactured by TA Instruments

Average rate of temperature rise: 5° C./minute

Atmosphere gas: nitrogen (50 ml/minute)

About 2.5 mg of a homopolymer was subjected to the measurement, and its glass transition temperature was defined as the temperature at the middle point of the endothermic peak.

D110N represents a trimethylolpropane adduct of xylylene diisocyanate (D110N (trade name) manufactured by Mitsui Chemicals, Inc.); D140N a trimethylolpropane adduct of isophorone diisocyanate (D140N (trade name) manufactured by Mitsui Chemicals, Inc.); TETRAD-C 1,3-bis(N,N-diglycidylaminomethyl)cyclohexane (TETRAD-C (trade name) manufactured by MITSUBISHI GAS CHEMICAL COMPANY, INC.); and TETRAD-X N,N,N',N'-tetraglycidyl-m-xylenediamine (TETRAD-X (trade name) manufactured by MITSUBISHI GAS CHEMICAL COMPANY, INC.).

DESCRIPTION OF REFERENCE SIGNS

Reference sign 1 represents a capacitance touch panel, 11 a decorative panel, 12 an adhesive layer or an adhesive sheet, 13 an ITO film, and 14 a hard coated film.

The invention claimed is:

1. A pressure-sensitive adhesive sheet, comprising a transparent conductive film as a support and a pressure-sensitive adhesive layer formed on at least one surface of the transparent conductive film,
   wherein the transparent conductive film comprises a metal thin layer and a transparent plastic film substrate,
   wherein the pressure-sensitive adhesive layer is formed on a surface of the metal thin layer,
   wherein the pressure-sensitive adhesive layer is obtained from a pressure-sensitive adhesive composition,
   wherein the pressure-sensitive adhesive composition comprises a (meth)acryl-based polymer obtained by polymerization of a monomer component including 19 to 45% by weight of an alkyl (meth)acrylate having a branched alkyl group of 14 to 24 carbon atoms at an ester end, and
   wherein the branched alkyl group of 14 to 24 carbon atoms has a t-butyl group.

2. The pressure-sensitive adhesive sheet according to claim 1, wherein the monomer component further includes 0.1 to 30% by weight of at least one functional group-containing monomer selected from a carboxyl group-containing monomer, a hydroxyl group-containing monomer, and a cyclic ether group-containing monomer.

3. The pressure-sensitive adhesive sheet according to claim 1, wherein the monomer component further includes 0.5% or more by weight of at least one selected from an alkyl (meth)acrylate having a branched alkyl group of 3 to 9 carbon atoms at an ester end, an alkyl (meth)acrylate having a linear alkyl group of 1 to 24 carbon atoms at an ester end and an alkyl (meth)acrylate having a cyclic alkyl group at an ester end.

4. The pressure-sensitive adhesive sheet according claim 1, wherein the monomer component further contains a polyfunctional monomer, in amount up to 3% by weight.

5. The pressure-sensitive adhesive sheet according to claim 1, wherein the monomer component further comprises 0.01 to 5 parts by weight of a crosslinking agent based on 100 parts by weight of the (meth)acryl-based polymer.

6. The pressure-sensitive adhesive sheet according to claim 1, wherein the pressure-sensitive adhesive layer has a relative dielectric constant of 3.5 or less at a frequency of 100 kHz.

7. The pressure-sensitive adhesive sheet according to claim 1, wherein the pressure-sensitive adhesive layer has a gel fraction of 20 to 98% by weight.

8. The pressure-sensitive adhesive sheet according to claim 1, wherein the pressure-sensitive adhesive layer has a haze of 2% or less when having a thickness of 25 µm.

9. The pressure-sensitive adhesive sheet according to claim 1, which has an adhesive strength of 0.5 N/20 mm or more to alkali glass at a peel angle of 90° and a peel rate of 300 mm/minute.

10. The pressure-sensitive adhesive sheet according to claim 1, wherein the (meth)acryl-based polymer is obtained by radiation polymerization of the monomer component.

11. The pressure-sensitive adhesive sheet according to claim 1, wherein the alkyl (meth)acrylate comprises at least one monomer selected from isomyristyl (meth)acrylate, isostearyl (meth)acrylate, isopentadecyl (meth)acrylate, isohexadecyl (meth)acrylate, and isoheptadecyl (meth)acrylate.

12. The pressure-sensitive adhesive sheet according to claim 1, wherein the alkyl (meth)acrylate is a t-butyl group-containing isostearyl acrylate represented by the following formula:

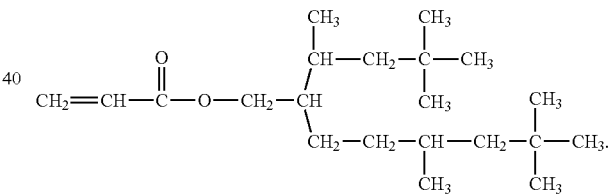

* * * * *